United States Patent [19]

Green

[11] 4,236,961
[45] Dec. 2, 1980

[54] PULPING LIGNOCELLULOSE IN CONTINUOUS PRESSURIZED BATCH DIGESTERS

[76] Inventor: Frank B. Green, 10835 SW. Muirwood Dr., Portland, Oreg. 97225

[21] Appl. No.: 917,015

[22] Filed: Jul. 25, 1979

[51] Int. Cl.³ .................. D21C 7/06; D21C 7/12; C21C 7/14
[52] U.S. Cl. .................. 162/52; 162/47; 162/61; 162/241
[58] Field of Search .................. 162/47, 52, 61, 241, 162/246, 233, 234, DIG. 2, DIG. 10, 19, 17, 49, 37, 40, 241

[56] References Cited

U.S. PATENT DOCUMENTS

| 2,583,994 | 1/1952 | Briggs | 162/DIG. 2 |
| 2,824,800 | 2/1958 | Rosenblad | 162/47 |
| 2,849,315 | 8/1958 | Haglund | 162/241 |
| 2,938,824 | 5/1960 | Richter | 162/52 |
| 3,434,920 | 3/1969 | Green | 162/237 |
| 3,607,620 | 9/1971 | Carlsmith | 162/52 |

Primary Examiner—S. Leon Bashore
Assistant Examiner—Steve Alvo
Attorney, Agent, or Firm—Eugene D. Farley

[57] ABSTRACT

Lignocellulose is pulped batchwise by introducing it and the white liquor in predetermined quantity, together with a variable quantity of black liquor, into a continuously steam pressurized digester. When the cooking cycle has been completed, the pulp product is withdrawn. The time intervals of feed material introduction and pulp product withdrawal are correlated to insure that all of the lignocellulose charged to the digester is cooked uniformly, as by withdrawing the pulp product over a time interval which is substantially equal to the feed time. For economy and efficiency of operation, the digester preferably is operated in conjunction with one or more companion digesters to which it is connected. The first digester then is blown while a second digester is charged, making possible transfer of hot pressurized black liquor from the former to the latter.

3 Claims, 8 Drawing Figures

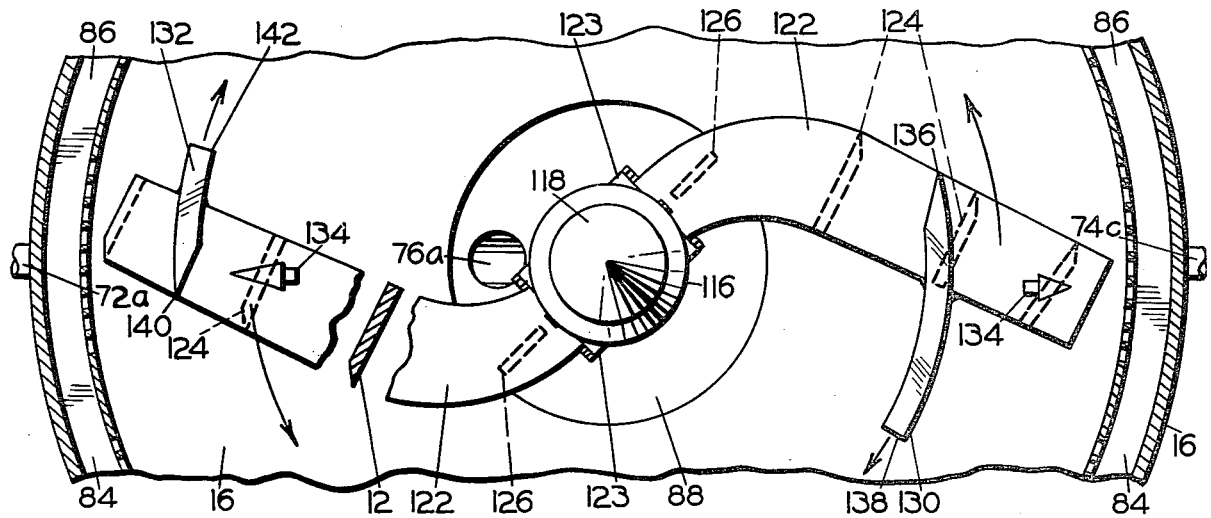
FIG. 6
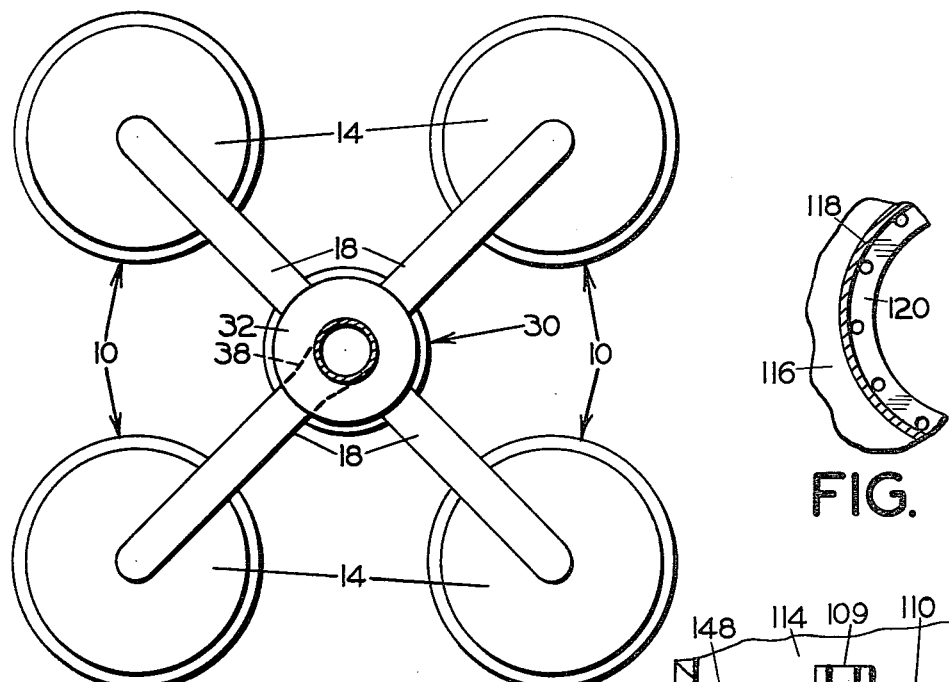
FIG. 2
FIG. 7
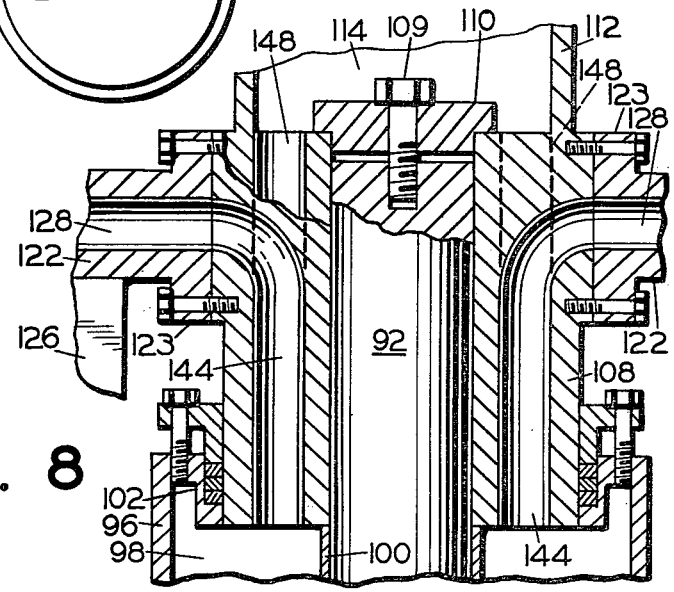
FIG. 8

PULPING LIGNOCELLULOSE IN CONTINUOUS PRESSURIZED BATCH DIGESTERS

BACKGROUND AND SUMMARY OF THE INVENTION

This invention pertains to method and apparatus for pulping lignocellulose. It pertains particularly to method and apparatus for pulping lignocellulose in continuously pressurized batch digesters. The invention is applicable particularly to the pulping of wood chips and is described with reference to this application, although it is applicable also to the pulping of other lignocellulose such as bagasse and various vegetable products in the form of small pieces.

The conversion of lignocellulose to fibrous pulps is a sophisticated and highly developed art which supplies a wide variety of cellulosic pulp products to industry on the large commercial scale.

Of the various well known pulping procedures, those in which the lignocellulose is pulped by cooking with chemicals are the most highly significant. The cooking operation is carried out either batchwise or continuously, depending upon whether batch type or continuous type digesters are employed.

In the batch process, the raw materials are charged into a vessel at atmospheric pressure. The pulping chemicals in solution form are pumped to the digester either during or after the operation by which it is charged with solid lignocellulose.

After the digester has been fully charged at atmospheric pressure, it is sealed and its contents raised to cooking temperature and pressure by the introduction of pressurized steam. The time required to reach cooking temperature (time to temperature) varies normally between 45 minutes and 90 minutes depending primarily upon the availability of high pressure steam. The digester contents are held at the predetermined pressure and temperature (time at temperature) until the lignocellulose has been cooked to the desired degree. The digester then blown. This operation discharges the cellulosic pulp and at the same time reduces the digester to atmospheric pressure.

In the digestion of lignocellulose by the continuous process, on the other hand, the digester is charged continuously with the solid lignocellulose and pulping liquors at a controlled rate and against cooking pressure. The charge progresses continuously through the digester and is discharged continuously therefrom, also at a controlled rate, without loss of digester pressure.

In a comparison of the two, the batch digestion process demonstrates important advantages which have determined its popularity in the paper mills of the world over a long period of time.

Batch digestion apparatus is relatively simple in construction and operation, as well as easy to maintain. It is comparatively inexpensive so that capital investment is relatively low. Elaborate and sensitive control systems are not required. The apparatus is easy to start and stop; easy to fill and empty. Down time is low. Recovery of turpentine, a by-product of increasing value, is high.

Despite these significant advantages, the operation of batch-type digesters is attended by several unfavorable features. Important among these is their high steam requirement stemming from the relatively large volume of digesting liquors which must be used to submerge the chips; the necessity of carrying out heat recovery operations at atmospheric pressure as the digester is emptied; and the necessity of heating the digester shell each time the apparatus is filled with cold chips at atmospheric pressure.

Additionally, batch digesters have the disadvantage that they do not produce pulp of uniform quality. This results from several causes.

A principal cause lies in the impossibility of heating the digester charge uniformly. This is important, because a variance in cooking temperature of as little as 2° F. will result in measurable variation in pulp quality. A digester holds many tons of material. When the temperature of the charge is increased by local application of heat, local elevation of the charge temperature at the points of heat application obviously occurs. The charge approaches uniform temperature throughout only when the digester reaches cooking temperature.

Second, the method used for emptying or blowing a batch digester contributes to non-uniform pulp quality. The vessel conventionally is emptied in a relatively short time through a single pipe of relatively small diameter, as compared with the digester diameter. In a typical installation the blow pipe of a digester having a diameter of 9 to 14 feet may have a diameter of but 6 to 10 inches.

The necessary result is that the thick mass of cooked pulp at a consistency of from 16 to 22% does not discharge from the digester in an orderly fashion. Rather, some of the pulp toward the top of the digester exhausts therefrom in advance of pulp located further down in the digester. Obviously, the latter pulp has been cooked longer than the former pulp with the result that the pulp leaving the digester is of non-uniform quality.

A third factor rendering batch digester pulp non-uniform lies in the difficulty of controlling all of the variables when cooking successive batches of pulp. The chips or other lignocellulose charged to the digester in successive batches are subject to variations in moisture content and density. Such variations will change cooking conditions, even though nearly identical volumes of solid raw material and chemical solutions are fed successively to the digesters. The result is the production of non-uniform pulp over a series of batch digester runs.

A fourth factor affecting pulp uniformity adversely is that the usual variation in chip moisture content from batch to batch results necessarily in a corresponding variation in the amount of condensate formed within the digester. This in turn affects the concentration of the digester liquors in the vicinity of the chips so that in a given time interval a greater or lesser degree of chip cooking will occur.

Yet another disadvantage attending the application of batch digesters is determined by the fact that since the digesters are charged cold with chips in a rigid and unyielding condition, advantage cannot be taken of the compaction factor which potentially is present if the chips were to be in a soft and yielding condition. This decreases the capacity of the digester correspondingly.

The continuous process of digesting cellulosic pulps overcomes many of the foregoing deficiencies which characterize the batch process.

In particular, steam requirements are comparatively low, peak steam loading problems are minimized, and pulp uniformity is improved, as is the pulp compaction factor. Nevertheless, these advantages of the continuous pulp digesting method are over-shadowed by such adverse factors as the complexity and high cost of the continuous apparatus, which necessarily must be employed; increased capital expenditures; increased maintenance; difficulties incurred in starting, stopping, and filling the apparatus; production losses during down time; and low turpentine recovery.

The present invention is designed to provide a batch process for pulping lignocellulose which overcomes the deficiencies of the prior art batch-pulping procedures while retaining their advantages.

It thus is a principal of the present invention to provide a batch procedure for pulping lignocellulose, which process produces a high yield of cellulosic pulp of uniform quality in batch apparatus of simple, easily operated construction having sharply reduced steam requirements even lower than those enjoyed heretofore by the continuous digesters of the prior art.

Another object of the present invention is the provision of a batch procedure for pulping lignocellulose which compensates automatically for variable moisture content of the lignocellulose charge; which has exceptionally high heat recovery; which makes possible an increased recovery of turpentine; which has a high compaction ratio of the chips charged to the digester; and which produces a uniform pulp of high grade.

Still another object of the present invention is the provision of batch lignocellulose pulping apparatus making possible the effectuation of a process, achieving the foregoing objects in batch digesters of the class generally in use with but relatively minor modifications thereof.

The foregoing and other objects of the present invention are achieved by the provision of a batch process for pulping lignocellulose which, basically considered, differs from the conventional batch process in that the digesters are continuously pressurized during their filling, cooking, and discharging cycles.

In carrying out the process, the digester first is brought to pressure by the introduction of steam. The predetermined quantities of wood chips or other lignocellulose and of the white liquor then are introduced into the digester against the steam pressure, together with a variable quantity of black liquor, as required. The feed materials are fed in controlled flows over predetermined time intervals until the calculated quantities have been added. The feed flows then are stopped.

The digester is maintained at cooking pressure and temperature throughout the entire operation. When the material first charged to the digester has been cooked to the desired extent, the discharge flow is initiated and continued at a rate substantially equal to the rate of feed of the raw materials. It then is continued until all of the cooked pulp has been exhausted from the digester. Thus if the cooking cycle comprises one hour, the flow of feed materials may be started and continued for a period of one hour. At the end of this time the digester will be fully charged and the feed flow is stopped. Also, the chips first introduced will have been subjected to cooking conditions for the required one hour period.

The discharge flow of pulp thereupon is started and continued for one hour at substantially the same rate as the feed was introduced into the digester. As a consequence, the last pulp to be discharged from the digester will have been cooked for exactly one hour, as will all intermediate pulp portions.

If it is desired to fill the digester completely in a shorter period, for example 30 minutes, while still retaining a one hour cooking cycle, the flow is started at such a rate as to accomplish this purpose. The flow of feed materials is terminated after 30 minutes and the digester maintained at temperature and pressure for another 30 minutes. At the end of this time the material first introduced will have been cooked exactly one hour. Accordingly, the discharge flow is started and continued at a rate such that the material is completely discharged from the digester in a period of one-half hour.

To expedite this procedure, and to conserve neat, the method is carried on to best advantage using a plurality of digesters in cooperation with each other. One digester is filled as another is emptied, using the same time cycles, and using the hot black liquor from an emptying digester as part of the charge for a filling digester, all the while maintaining both systems at full operating pressure, as will be explained in greater detail hereinafter.

To accomplish this result, batch digestion apparatus is provided wherein a plurality of digesters, at least two, and preferably four, are arranged in a group and provided with means for feeding them sequentially from separate or common sources. Suitable piping is provided for introducing steam, pulping chemicals and digestion liquor, both fresh and spent, into the digesters as needed. Furthermore, each digester at its outlet end is provided with means for introducing spent displacement liquor in such a manner as to displace the hot black liquor for heat recovery and reuse while diluting the pulp for discharge from the digester.

DESCRIPTION OF PREFERRED EMBODIMENTS OF THE INVENTION

An illustrative and preferred embodiment of the presently described method and apparatus for pulping lignocellulose in continuously pressurized batch digesters is illustrated in the drawings wherein:

FIG. 2 is a plan view of the system of FIG. 1 looking in the direction of the arrows of lines 2—2 of that figure;

FIG. 6 is a fragmentary, detail, sectional view in plan taken horizontally across the bottom of the digester of FIG. 5 looking in the direction of the arrows of line 6—6 thereof;

FIG. 7 is a fragmentary, detail, sectional view taken along line 7—7 of FIG. 5; and FIG. 8 is an enlarged, fragmentary, sectional view similar to FIG. 5, but with parts broken away to show concealed construction.

Figure 1:
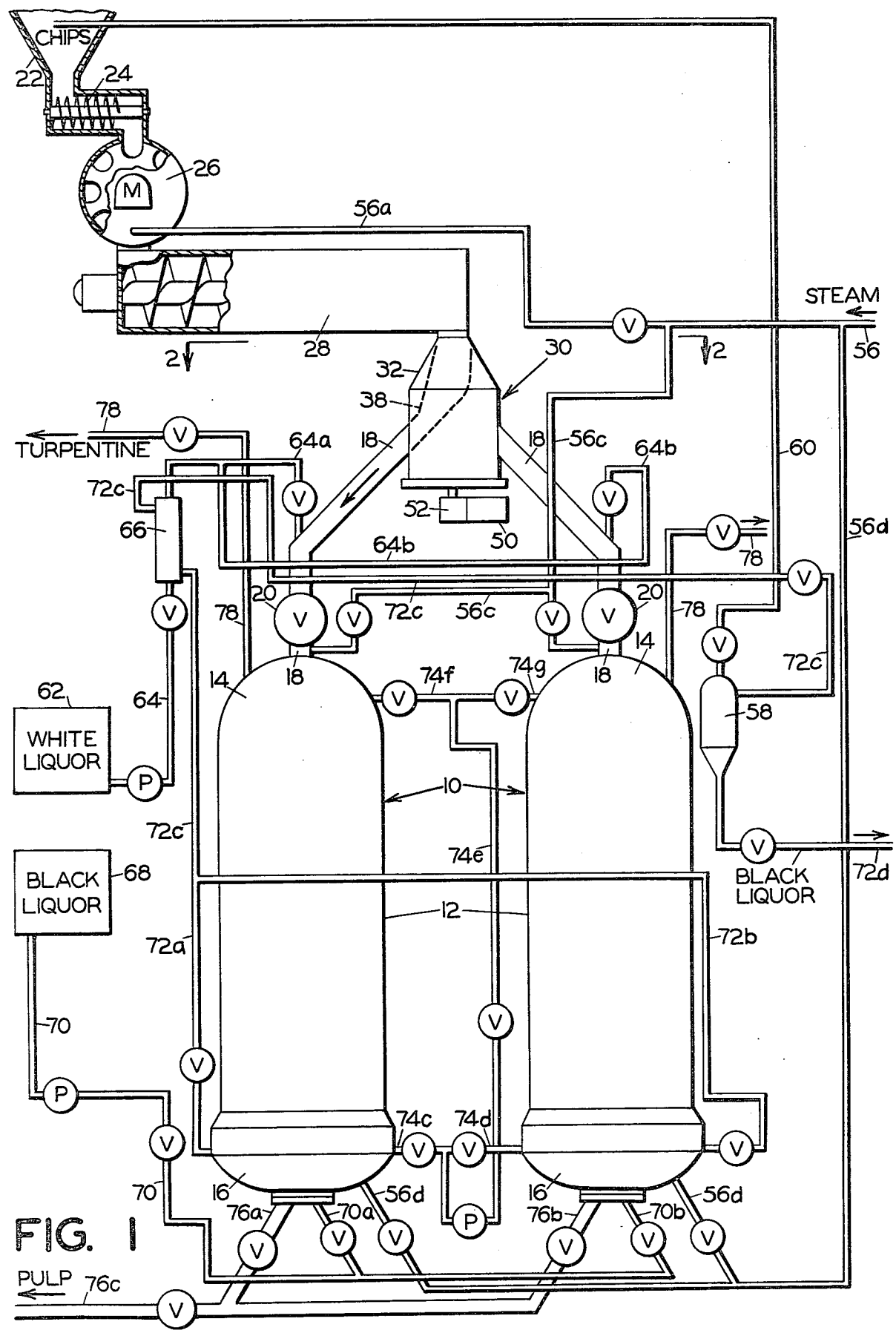
FIG. 1 is a schematic view in elevation of a system including plural digesters employed in the execution of the presently described process.

In its broad aspect, the hereindescribed method and apparatus for pulping lignocellulose in continuously pressurized batch digesters is applicable to the preparation of chemical cellulosic pulps by any of the commonly employed chemical lignocellulose pulping procedures such as the calcium base sulphite process, the magnesium base sulphite process, the soda process and the kraft process.

It is applicable particularly, and is described with particular reference to, the widely used kraft process wherein wood chips are converted to cellulosic pulp by treating them at elevated temperatures and pressures in a reaction vessel or digester charged in part with fresh aqueous pulping liquor containing sodium hydroxide and sodium sulphide (white liquor), and in part with spent digestion liquor (black liquor) from a previous run and containing residual pulping chemicals as well as dissolved solids extracted from the wood.

Although the process of the invention can be carried out in a single digester, for reasons of improved efficiency and economy it is preferred to carry it out in a plurality of digesters mounted adjacent each other and operated in cooperation with each other. In the illustrated form of the invention there are four such digesters each of which is indicated generally at 10, FIGS. 1 and 2. Each digester comprises a large vessel 20 or more feet in height, from 9 to 15 feet in diameter and having a capacity of many tons of wood chips and cooking liquors. It is essentially similar to conventional digesters in that it includes a side wall 12, a top 14, and a bottom 16. It is of modified construction in that it includes a selective feeding device for feeding each of the companion digesters in turn; is interconnected by piping to its companion digesters for the transfer of liquors from one to the other; and includes at its bottom portion a novel assembly for removing from the digester both the spent cooking liquor and the cooked pulp.

Considering these in turn:

THE SELECTIVE DIGESTER FEEDING SUBASSEMBLY

The selective digester feeding subassembly by means of which each digester in turn is filled with wood chips is illustrated particularly in FIGS. 1–4 inclusive.

The feed means coupled to the top 14 of each digester 10 includes a centrally located feed pipe 16 dimensioned to pass wood chips in the desired flow and including a gate valve 20.

Feed pipe 18 is supplied with chips from a bin or hopper 22 the lower end of which communicates with a feed screw 24. Feed screw 24 in turn transmits the chips to a pressurized rotary feed valve indicated at 26. This in turn forces the chips into a pre-steaming unit 28. These various units of the feeding subassembly are conventional and are described, for example, in my U.S. Pat. No. 3,434,920 pertaining to continuous digesting apparatus.

The partially presteamed chips are delivered from unit 28 into a novel selective feeder having for its purpose the transmission of a metered flow of the chips to a selected one of feed pipes 18 which in turn conveys the chips to one or the other of digesters 10. The construction and manner of operation of this selective feeder is illustrated particularly in FIGS. 3 and 4.

The selective feeder, indicated generally at 30, comprises a sealed case 32 having a tapered top which is coupled to the outlet of delivery unit 28. A pipe extension 32a extends inwardly into the interior of the case.

The upper ends of downwardly sloping chip feed pipes 18, which supply the respective digesters 10, are sealed at 90° intervals to the side walls of case 32 and communicate with the interior thereof.

The bottom of case 32 is open and fitted with a plug or cap 34 which is removably secured to the case in sealed relation by means of bolts 36. The inner face of cap 34 provides a lignocellulose accumulation floor 35 which is flat and substantially coplanar with the lower margins of the ends of feed pipes 18.

The upper end of a downwardly tapered spout 38 telescopes over inwardly directed extension 32a of case 32. The spout is contoured and arranged so that its open lower end registers in turn with the open upper ends of pipes 18. The spout is supported by means of an integral, downwardly extending sleeve 40.

The sleeve in turn is supported by a shaft 42 which extends upwardly through a central opening with associated packing gland 44 in cap 34. The shaft is mounted for rotation in a bearing assembly 46 integrated with and supported by brackets 48 which extend downwardly from the lower face of cap 34.

Spout 38 is rotated between its four positions of adjustment in which it registers with the respective upper ends of feed pipes 18 by means of a motor 50 which drives shaft 42 through gear box 52, FIG. 1.

Figure 3:
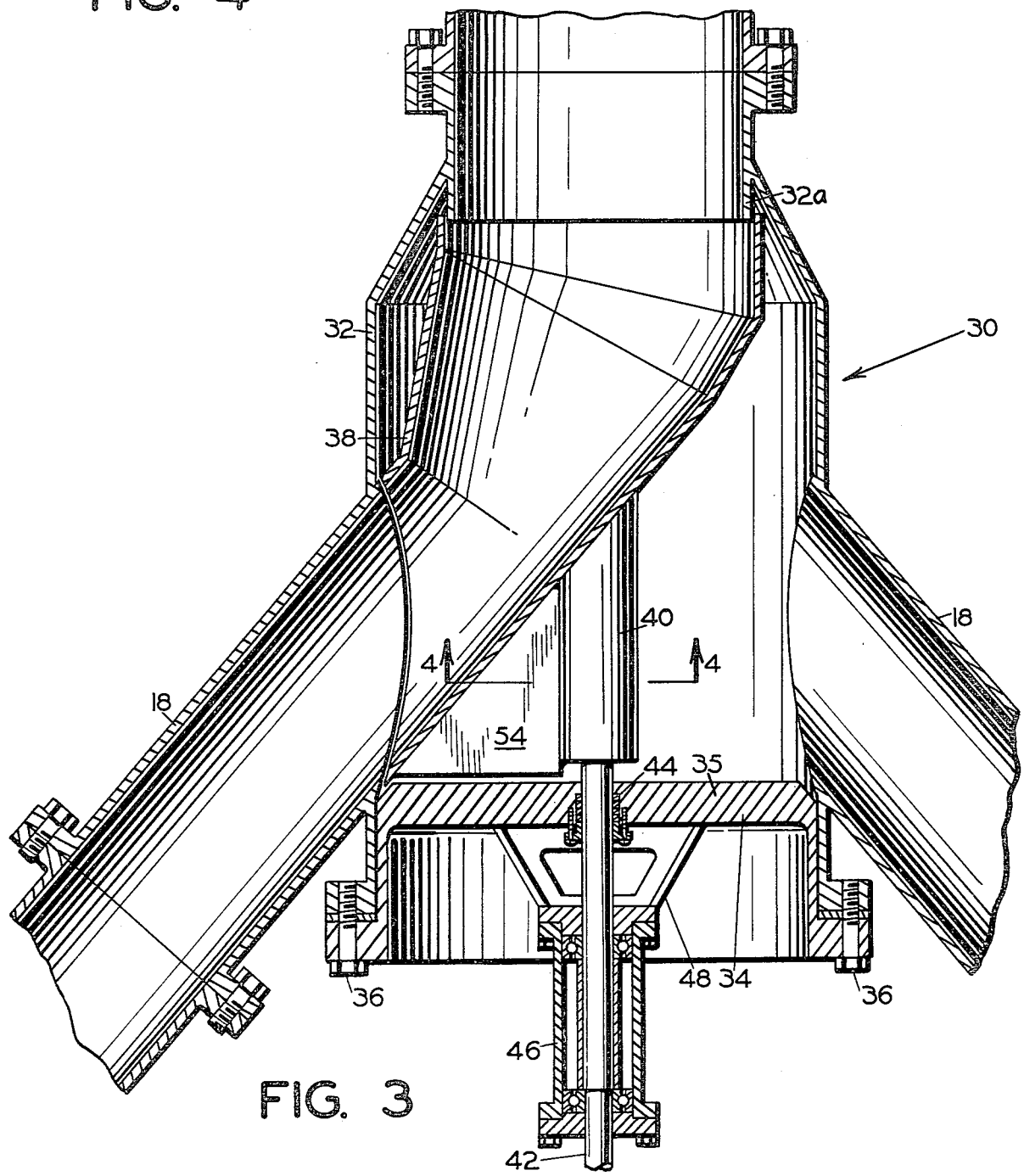
FIG. 3 is a fragmentary, sectional view in elevation illustrating chip feeding apparatus employed for selective feeding of chips to the plural digesters of the system of FIGS. 1 and 2.

As is evident particularly in FIG. 3, to make possible free rotation of spout 38 within case 30 there is provided a gap or clearance between the lower end of the spout and the upper end of feed pipe 18. This gap is of insufficient width to pass the chips as they are driven downwardly into the digester. However, there is associated with the chips an appreciable percentage of sawdust which is sufficiently small to pass through the gap. It is present in sufficient amount to clog the feeding apparatus if not disposed of effectively.

Figure 4:
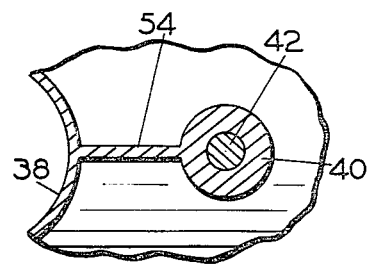
FIG. 4 is a fragmentary, detail, sectional view taken along line 4—4 of FIG. 3.

Means accordingly are provided for collecting the sawdust and transferring it to the digesters where it is converted to pulp along with the chips. The means employed for this purpose is illustrated in FIGS. 3 and 4.

A wiping plate 54, triangular in outline to fit the space between sleeve 40 and the underside of spout 38, is fixed to both of the latter. The lower edge of plate 54 is parallel to and in wiping relation to floor 35 on the upper surface of cap 34.

Any sawdust which leaks through the cracks between the spout and the feed pipes will accumulate on floor 35. Then as the spout is driven from one feed pipe to the other, the sawdust will be wiped from the floor and transferred into the next succeeding feed pipe, where it mixes with the chip feed and is transferred to the digester.

THE DIGESTER PIPING

High pressure steam, low pressure steam, and the pulping chemicals are supplied to and withdrawn from the digester by conduit means comprising piping circuits arranged as follows, FIG. 1:

High pressure steam from the mill source is introduced through main steam line 56. It is distributed through valved branch steam line 56a to rotary valve 26 and through line 56b to presteamer 28; through branch line 56c to the tops of digesters 10; and through branch lines 56d to the bottoms of digesters 10. Appropriate valving is included in the lines as required to control the steam flow in the desired manner.

Low pressure steam is transmitted from a flash tank 58 in which it is generated through a valved line 60 into chip hopper 22 for low pressure presteaming of the chips.

White liquor is fed from a storage tank 62 through a feed line 64 which includes suitable flow control units and traverses a heat exchanger 66. It supplies a first branch line 64a, which feeds one of the digesters, and a second branch line 64b, which feeds another of the digesters. Branch lines 64a and 64b include suitable control valves.

Black liquor is fed to the digesters from two sources: From black liquor storage and from one digester to another.

In the first black liquor circuit, the liquor is fed from a reservoir 68 through a line 70 fitted with flow control means to a first valved branch line 70a and to a second valved branch line 70b which feed black liquor into the bottoms of the respective digesters.

Hot black liquor displaced from the digesters travels via lines 72a and 72b connected to the bottoms of the respective digesters to a mainline 72c which serves heat exchanger 66. Mainline 72c is equipped with a valved flow control unit and feeds into flash tank 58 which generates low pressure steam as noted above. The cooled black liquor then passes in controlled flow through an exhaust line 72d which transfers it to storage.

Hot black liquor may be transferred from one of digesters 10 to the other via a piping system which includes interchange pipe pair 74c and 74d. These feed a connecting pipe 74e through appropriate and conventional flow control and valving units. The latter pipe connects with valved pipe 74f and 74f which feed black liquor to the top portions of the digesters, all in a manner to be explained hereinafter.

The cooked pulp is discharged or blown from the digesters by means of pulp discharge means comprising blow lines 76a, 76b coupled to the bottom of the vessel and including conventional control valves. These lines feed a flow-controlled main blow line 76c. The latter conducts the pulp to further processing.

The turpentine produced during cooking of the chips is exhausted from the upper portions of the digesters by valved turpentine recovery pipes 78.

THE PULP AND DIGESTION LIQUOR DISCHARGING SUBASSEMBLY

Whereas the conventional batch digester shell normally has a conical bottom, the bottom of the presently described continuously pressurized batch digester preferably is ellipsoidal, a change which may be readily effectuated if it is desired to convert the former to the latter. The functions of the ellipsoidal bottom of the presently described digester are to facilitate washing of the pulp, to discharge the pulp and the digestion liquor in a manner such as to preserve optimum qualities in the pulp, and to conserve heat for processing a further quantity of chips.

Figure 5:
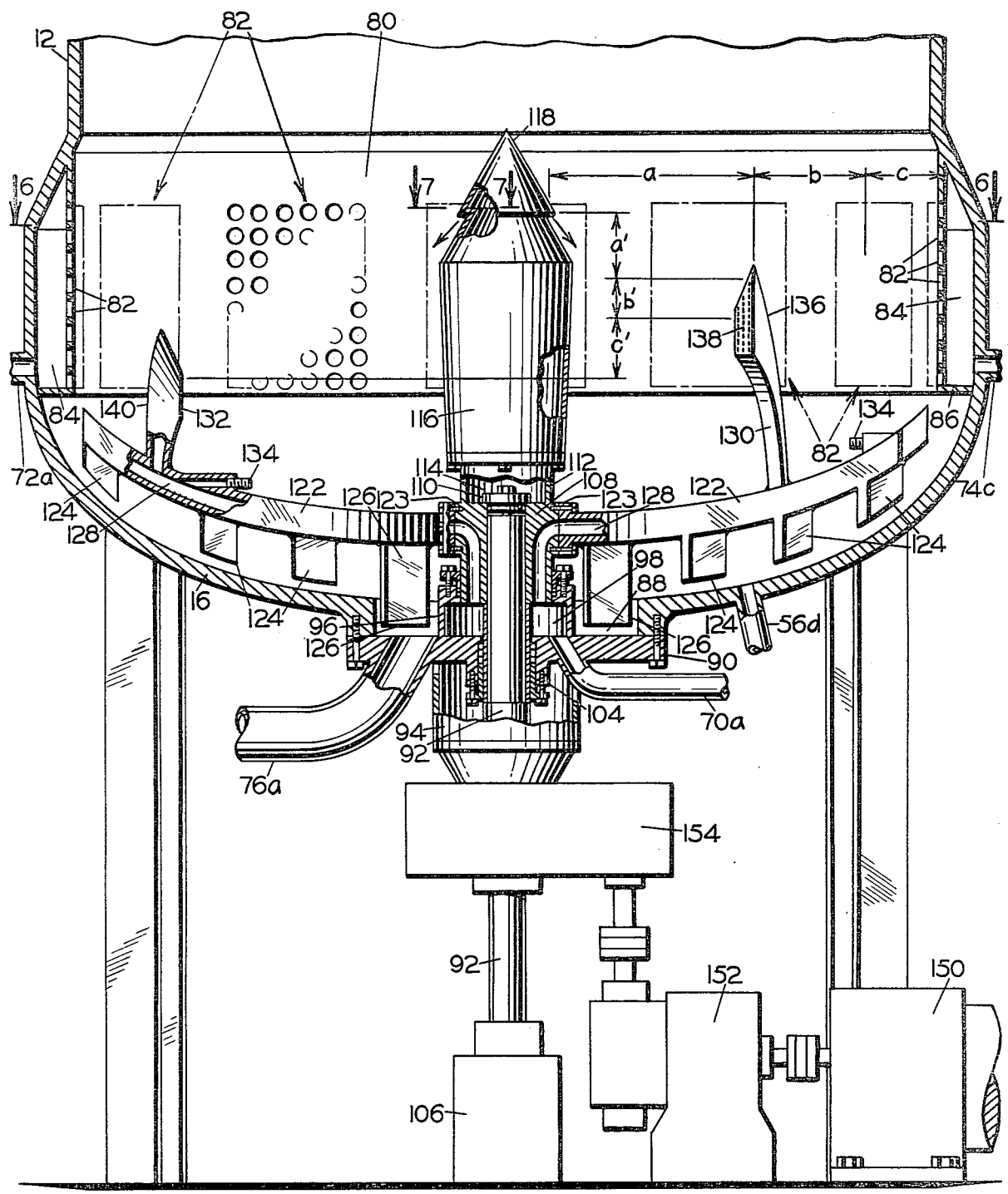
FIG. 5 is a fragmentary, sectional view of the bottom portion of a digester of the digester system of FIG. 1, illustrating the manner of discharging the digester contents at the conclusion of a cook.

To this end the ellipsoidal bottom of the digester houses displacement liquor inlet means comprising a combination pulp flow liquor diffuser-pulp strainer subassembly, the construction and manner of operation of which are particularly apparent in FIGS. 5, 6 and 7.

It will be noted that pipes 72a, 74c, through which the hot spent black liquor discharges from the apparatus, communicate with the digester through outlet ports located a spaced distance upwardly from the bottom of the latter. Directly opposite the outlet ports is positioned a perforated metal plate 60 having a plurality of groups of perforations 82. This provides a strainer which separates the pulped chips, which still retain their chip form to a certain extent, from the liquor in which they have been digested.

As the liquor passes through the strainer, it enters a chamber 84 bounded by the outwardly bulging side wall of the digester, the strainer plate 80, and a floor plate 86. As a result of this construction, any liquor passing through the strainer is channeled through spent digesting liquor outlet means comprising pipe 72a, if it is desired to pass the hot liquor to heat exchanger 66 and thence to storage, or through pipe 74c, if it is desired to pass the hot liquor to a companion digester.

This transfer of black liquor occurs at the conclusion of the cook when the valve in blow line 76a is opened. At this time not only is the pulp withdrawn from the digester through blow pipe 76c, but a stream of cool displacement black liquor from the pulp washing apparatus or from storage is introduced through pipe 70a in a manner calculated to displace the hot cooking liquor and force it out one or the other of pipes 72a and 74c without disturbing the pulp in the digester.

To this end the bottom of the digester shell has a central opening 88 which provides a sump. A cap plate 90 is bolted across this opening in sealed relation. Plate 90 has a central opening which receives a vertical drive shaft 92. A downwardly extending case 94 supports gear box 154. An annular, upwardly extending, integral wall 96 surrounds the shaft above the cap plate and creates a chamber 98. A bushing 100 receives the shaft in the area of the opening through the plate and stuffing boxes 102, 104 provide seals above and below the latter.

The lower end of the shaft is supported in a thrust bearing 106. Its upper end supports and engages a substantial channeled sleeve or hub 108. The sleeve is keyed to the shaft and secured thereto by means of a locking bolt 109 and associated plate 110.

Sleeve 108 has a vertical extension 112. This forms a central chamber 114. Extension 112 is provided at its top with an annular flange to which is bolted a stand pipe 116. This is hollow, as indicated in FIG. 5, and has a truncated conical top. The conical top mounts an overlapping conical cap 118. A perforated plate 120 is mounted on top of stand pipe 116 with the perforations positioned in the joint between the stand pipe and the overlapping conical cap 118. The inner surface of the cap accordingly acts as a guide for fluid discharged through the perforations of perforated plate 120.

Sleeve 108 also mounts a pair of aligned plow arms 122. The arms are concavely arcuate in the vertical plane and, in combination, slightly S-shaped in the horizontal plane to provide a configuration which will not disturb the natural settling of the pulp as it progresses through the lower part of the digester.

The inner ends of the arms are integrated with the sleeve by suitable means, as being bolted thereto through flanges 123. The arms mount a plurality of downwardly extending plates or teeth 126 which extend nearly to the bottom of the digester for moving the pulp contents in that area. They also mount a pair of elongated teeth 126 which extend downwardly into sump 88 for moving the sump contents. Plates 124 lie substantially parallel to the direction of movement of the arms, while teeth 126 lie substantially normal thereto.

Plow arms 122 have longitudinal bores 128 extending completely to their outer ends. They mount intermediate their ends inlet port means in the form of a pair of upwardly extending, radially and vertically spaced, diffuser heads 130, 132 and, on their terminal upper surfaces, inwardly directed liquor inlet nozzles 134. All of these communicate with hollow bores 128 of the arms.

It is to be noted that the leading edge 136 of diffuser head 130 is sharp and its trailing face 138 is perforated. Similarly, the leading edge 140 of diffuser head 132 is sharp while its trailing face 142 is perforated. The sharp edges divide the pulp as the arms rotate in the digester. The perforated faces facing rearwardly dispense the liquid in such a manner that it diffuses, rather than jets, into the pulp.

Furthermore, diffusion heads 30, 136 not only are stationed at different elevations: they also are stationed at different radial positions with reference to stand pipe 116. Still further whereas the diffusion heads dispense liquid rearwardly with reference to the direction of motion of arms 122, liquor inlet nozzles 134 are located at the lowermost vertical plane, almost at the bottom of the digester, and are directed inwardly with respect to the latter.

Liquor is supplied to the bores 128 of arms 122, and thence to the diffusion heads and liquor inlet nozzles, by means of channels 144 through sleeve 108.

Fluid is supplied to stand pipe 116 by means of a third channel 148 through sleeve 108.

Channels 144, 148 communicate with chamber 98 which in turn is fed with liquor from pipe 70a. Blow pipe 76a is fed with pulp from sump 88.

The entire arm assembly, mounted on sleeve 108 as a hub, and including stand pipe 116, arms 122, diffusers 130, 132 and liquor inlet nozzles 134, is rotated at a predetermined speed in the bottom of the digester by a drive which consists of a motor 150 coupled to a reduction gear 152. The latter in turn is coupled to a gear box 154 which engages splined shaft 92.

The pulp and digestion liquor discharging subassembly above described functions in a manner which insures that the pulp is discharged from the digester in orderly fashion, i.e. in a first in, first out manner. It also functions to insure that before the pulp is discharged, the hot digestion liquor is cleanly separated and transferred either to the line feeding the heat exchanger or to that feeding a companion digester. Such an orderly operation of the subassembly requires that the introduction of the added displacing liquor be accomplished by means of a diffusion process which initiates and continues a regular flow of the displacing liquor toward the side walls of the digester. Since the digested charge still retains its chip form, such a flow of a more dilute liquor of different density acts to sweep the more concentrated cooking liquor out from the spaces surrounding the cooked chips without breaking up the softened chips, and thereby maintaining a high pulp drainage rate.

In order to accomplish this, however, it is necessary to compensate for the fact that as the diffusion liquor travels outwardly from its sources, the pulp is traveling downwardly. This is the reason for the distinctive vertical and radial spacing of the diffusion heads.

As is apparent from FIGS. 5 and 8, the displacement liquor introduced through pipe 70a passes into chamber 98 thence into stand pipe 116 via channel 148, and into the bores 128 of arms 122 via channel 144. The liquor is under a pressure sufficient to drive it into the digester in controlled flows through the various liquor dispensing elements.

The diffusing element at the greatest elevation in the digester is perforated plate 120 in the conical top of the stand pipe. The amount of liquor transmitted through this plate is coordinated with the vertical travel of the pulp in such a manner that the liquor will diffuse through a horizontal zone "a" while the pulp is traveling through a vertical travel zone "a'".

Similarly, the rate of flow of the displacing liquor from diffusion plate 138 of diffuser 130 is coordinated with the vertical travel of the pulp in such a manner that the diffusion liquor travels through the horizontal zone "b" while the pulp traverses the vertical travel path "b'".

Finally, the flow through the lowermost of the diffusion elements, diffusion head 132, is coordinated with the pulp travel in such a manner that the liquor diffused by this head travels through a horizontal travel zone "c" during the interval that the pulp travels a vertical path indicated by "c'".

This brings the pulp to the lower margin of strainer plate 80. When it has reached this point the hot liquor which it originally contained has been substantially completely displaced. It has passed through the plate into chamber 84, and cut through one or the other of pipes 72a or 74c.

After the pulp has passed below the strainer plate zone, it enters a zone at the bottom of the digester where it is moved by arms 122 carrying plow teeth 124. At the same time, it is diluted with a further quantity of liquor introduced through liquor inlet nozzles 134 to a blow consistency of not over about 15%, preferably from 5 to 12%, at which it can pass in a smooth, uniform flow through sump 88 and into blow pipe 76a which transfers it to the washers and further processing.

OPERATION

The operation of the hereindescribed apparatus for pulping lignocellulose in continuously pressurized batch digesters is as follows:

The underlying concept of the invention can be practiced and its advantages realized in some degree by the operation of a system including but a single continuously pressurized digester. However, the invention is practiced to best advantage using a system containing a plurality of digesters. Accordingly its operation is described herein with reference to a system including four digesters arranged in a group, having a common wood chip feed, and operably interconnected by means of piping for transferring the digester liquids from one digester to another, and the pulp product to common processing apparatus as required to meet the demands of a given situation. The operation is flexible in that it may be carried out with presteaming of the lignocellulose feed either in presteamer 28, or in digester 10, and with the use of variable amounts of black liquor feed introduced from selected sources.

Presteaming is desirable since it brings the chips rapidly to digestion temperature. It also conditions the chips to render them receptive to the action of the digesting liquors. As a result of these two factors, the digestion of the chips will start almost contemporaneously with their introduction into the digester.

Where presteaming of the lignocellulose feed is practiced, the wood or other lignocellulose feed material in the form of chips or small pieces is fed to the digester by means of a closed, pressurized system which not only has provision for presteaming the chips, but also has the capacity for introducing the chips to the digester against a pressure head in accurately metered flow.

Referring to FIGS. 1 and 3, the chips contained in hopper or bin 22 are first presteamed with low pressure at a temperature of 60° to 120° F. The low pressure steam advantageously is prepared by flashing in flash unit 58 the hot black liquor exhausted from the digester and transferring the resulting steam to hopper 22 via pipe 60.

The partially presteamed chips are transferred by screw 24 to rotary feed valve 26. The latter unit in turn transmits the chips in metered flow to a screw type presteamer 28. Units 26, 28 are served with high pressure steam from the mill steam source through pipes 56a and 56b, respectively.

While still under pressure, the chips are transferred in controlled, metered flow to selective digester feeding unit 30. This unit is positioned to charge selectively one or the other of the four digesters 10, FIG. 2. In the illustrated embodiment, the feeder is set to feed the lower hand one of digesters 10 via the lower hand one of chip feed pipes 18, with delivery spout 38 in its FIG. 3. position.

At the start of the basic cooking cycle, digester 10 first is pressurized with high pressure steam. The steam flows through branch steam line 56c and associated valving to the lower extremity of chip feed pipe 18 below gate valve 20. The latter valve is maintained in its open position at this time.

Steam also may flow through steam branch line 56d which communicates with the bottom portion of the digester. The steam thus fills the digester and in particular establishes a steam zone in the upper portion of the digester through which the chips, and the digesting liquors, must pass as they are introduced into the digester.

The extent to which the digester is pressurized with high pressure steam depends upon the character of the pulping process to be carried out. In cooking sulphite pulps, for example, it is desirable to impregnate the chips with cooking chemicals at a relatively low temperature and then to elevate the charge to full cooking temperature after such impregnation. This allows penetration of the cooking chemicals into the wood and prevents discoloration and weakening of the pulp.

More specifically, when cooking sulphite pulps, digester 10 first is pressurized with high temperature steam at a temperature of from 230° to 260° F. until the chips are sufficiently impregnated with cooking chemicals. Thereafter the digester temperature is raised to the cooking temperature of from 300° to 360° F.

On the other hand, when cooking kraft pulps, the digester is pressurized in the first instance with high pressure steam to full cooking temperature.

After the digester has been pressurized with steam, the flows of white liquor and black liquor are started. White liquor is fresh liquor. The black liquor comprises the digestion liquor which has been spent in greater or lesser degrees in the digestion of lignocellulose in previous digester runs. It is obtained from the digester itself, or from the washers employed to wash the pulp after the latter has been withdrawn from the digesters. It contains residual chemicals which it is desirable to conserve, as well as solids dissolved from the wood. If derived from an operating digester, it is substantially at a digestion temperature of from 340° to 360° F. However, if derived from storage, it is at a lower temperature of, for example, from 60° to 120° F.

The white liquor passes from storage tank 62 through pipe 64 to heat exchanger 66 where it is brought up to a temperature of about 320° F. by heat transfer with black liquor displaced from the bottom of the digester. The hot white liquor passes through pipe 64a in controlled and measured flow into chip feed pipe 18, above gate valve 20. There it is admixed with the chips being fed to the digester.

Black liquor in controlled flow is fed to the digester from selected ones of several sources. In the first place, hot black liquor substantially at digestion temperature may be introduced in the digester from a companion digester in the process of being blown.

Thus, in the illustration, hot black liquor from the right hand one of digesters 10 of FIG. 1 may be withdrawn from the digester through line 74d and transmitted through pipes 74e and 74f to the top of the left hand digester. Black liquor withdrawn from the bottom of left hand digester 10 through line 74c during operation of the digester may be circulated via lines 74c and associated valving to line 74e and thence to line 74f where it is introduced into the same digester from which it was withdrawn. Additional quantities of black liquor may be introduced into the system from black liquor storage tank 68 through pipes 70 and 70a, which coomunicate with the bottom of the digester.

After the digester has been brought to pressure and the flows of white and black liquor have continued for a set and predetermined time of, for example, about five minutes, the flow of chips is started. As is apparent from FIG. 1, and as noted hereinabove in a preferred mode of operation the liquors are mixed with the chips before they enter the digester. Also, within the digester the liquors trickle down through those chips which at the time are above the digester liquor level.

This procedural method serves a heat exchange function in bringing the chips to digester temperature. It also assures a substantially instantaneous rise of chip temperature to digester temperature, thereby protecting the chips from the pulp-degrading acid hydrolysis which otherwise would occur because of the reaction between the wood acids and the chip cellulose content in the steam environment of the digester.

As noted, the chips preferably are in a presteamed condition. The chip steaming continues within the digester, as the chips fall through the steam zone established in the upper portion thereof. It continues also as the chips stack up in the bottom of the digester, before they are submerged in the digestion liquors.

The time of steaming is variable, but in general should not coninue before and after introduction of the chips into the digester for a total of more than about 2 minutes. Excessive steaming degrades and weakens the pulp. In the preparation of dissolving pulps, the steaming period should be substantially longer, for example of the order of 30 minutes.

The controlled and measured flows of white liquor, and chips continues at a predetermined rate and the black liquor flow is adjusted in a manner and determined by such factors as the identity and condition of the lignocellulose starting material, the concentration of the liquors employed, the size of the digesting unit, and the other operating conditions.

During the feed cycle, the flows of chips and liquors are regulated so that the rate of rise of the liquor in the digester is constant and uniform. This is accomplished by adjusting the proportions of black liquor introduced from the various sources noted above, while adding the calculated amount of white liquor necessary to supply the cooking chemicals. This technique compensates automatically for varying amounts of water introduced into the digester as chip moisture content and steam condensate.

In the digester, the chips and liquor are heated immediately to digester temperature as they drop through the steam zone above the liquor pool. Accordingly the temperature is uniform throughout the digester.

In an alternate procedure, not involving a separate presteaming of the chips, the foregoing procedure is modified by first bringing the digester to pressure and then starting the flow of unsteamed chips. The flow is continued for a minute or two during which interval an accumulation of chips is built up on the floor of the digester. These are subjected, of course, to the steam environment.

The controlled and measured flows of white and black liquor then are started and the feed of chips continued. In this way the chips are subjected to a preliminary steaming within the digester itself, both by passing through the steam zone at the upper end of the digester during their downward progression, and in the stack of chips exposed above the liquor pool at the bottom of the digester before they are submerged in the liquor.

In either case, the feed flows are continued until the digester is filled. This may require for example from 15 minutes to an hour or more. The flows then are stopped.

At the conclusion of the cooking cycle, the digester is blown. In view of the large size of the digester and the length of time required to fill it, the digester blowing cycle may follow the filling cycle immediately.

For example, if it is desired to cook the chips for exactly one hour, and one hour is required to fill the digester, the chips first introduced into the digester will be cooked fully as the last chips of the charge are introduced. Accordingly, at the end of the one hour period, the blowing cycle is started as the feeding cycle is stopped. The blowing cycle is carried on at the same rate as the feeding cycle, i.e. over a period of one hour. Thus, all of the chips are cooked for exactly the same time.

On the other hand if a cooking period of one hour is desired and the feeding cycle required but 20 minutes, the chips are fed into the digester over a period of 20 minutes, after which the chip feed is terminated. The chips then are digested for 40 minutes, at the end of which time those chips first introduced into the digester will have been cooked for a total period of one hour. The blow cycle then is started and continued for a period of 20 minutes, insuring that all of the chips will be cooked for exactly one hour.

During the blowing of the digester use is made of the unique liquor displacement and pulp discharging unit illustrated in FIGS. 5 and 7.

Upon opening the valves in pulp discharge lines 76a, 76c, pulp is discharged from the digester in a controlled flow. This in turn causes a progression of the pulp downwardly in the digester.

As it progresses, the pulp is moved in the lower portion of the digester by the plow which includes rotating arms 122 keyed to shaft 92 and driven by motor 150. Rotation of the arms moves the pulp, and teeth 124 on the arms guide the pulp in the direction of discharge sump 88. The pulp in the discharge sump is moved by teeth 126. The assembly thus prevents pocketing and channeling of the pulp and of the liquor in the digester mass and establishes pulp discharge in an orderly first-in, first-out manner.

The rotation of arms 122 also assists in displacing the hot, relatively concentrated, black liquor with cool black liquor for the purpose of utilizing the heat in the former and diluting the discharging pulp with the latter. This is accomplished by the action of stand pipe 116, liquor diffusion heads 130, 132 and liquor inlet nozzles 134 mounted on the arms.

As is apparent from FIG. 5, cooled, dilute black liquor from storage or other processing units is transferred through pipe 70a into chamber 98. From there it passes through connecting channels 144 into hub 108 and out into the longitudinal bores 128 of arms 122. Thence it is dispensed in controlled flow through diffusion heads 130, 132 and nozzles 134, all of which communicate with bores 128.

At the same time, black liquor from chamber 98 passes through channel 148 in hub 108 and thence into the centrally located, hollow stand pipe 116, whence it is discharged through the ports in apertured plate 120, FIG. 7.

To correlate the downward progression of the pulp with the lateral movement of the displacement black liquor, the diffusion ports of stand pipe 116 and the heads of diffusers 130, 132 are at progressively lower elevations. As explained above, black liquor is discharged through the diffusers at a rate predetermined to cause it to flow laterally through horizontal digester zones a, b and c, in substantially the same time that the pulp progresses downwardly through vertical digester zones a', b' and c'. This minimizes turbulence and promotes linear flow of the displaced hot black liquor laterally through strainer plate 80 into annular chamber 84 and out through one or the center of the ports discharging into lines 72a or 74c.

Undue turbulence in the lower portion of the digester also is prevented by the fact that the leading edges 136, 142 of diffusers 130, 132 are knife edges, and diffuser plates 138, 140 are directed in the trailing direction. Also, the black liquor fed into the digester through the ports of plate 120 in the stand pipe is directed downwardly and outwardly by conical cap piece 118, which serves as a guide.

Nozzles 134 on arms 122 are at the lowest elevation of all and are directed inwardly. They introduce black liquor in amount predetermined to dilute the pulp to a discharge consistency not over about 15%, preferably from 5 to 12%.

The hot pressurized cooking liquor may be discharged through either pipe 72a or pipe 74c. If the latter, it is transferred hot directly to a companion digester. If the former, it is transferred first to heat exchanger 66, FIG. 1, which heats to substantially digester temperature the white liquor being charged to a companion digester. The cooled black liquor leaving the heat exchanger passes via a pipe 72c to flash tank 58 where its pressure is reduced to substantially atmospheric pressure. The steam recovered from the flash tank passes through pipe 60 into hopper 22 where it is employed to presteam chips being fed to the digester system. The cooled, depressurized black liquor passes through pipe 72d to storage or to other processing units. The heat of the black liquor thus is conserved in heat exchanger 66 and flash tank 58. The cool, dilute black liquor introduced through nozzles 134 cools the pulped chips to a temperature of below 215° F. and dilutes them to a consistency at which they may be exhausted through blow pipe 76a.

During the entire cooking cycle, turpentine is recovered from the digester head through valve-controlled pipe 78. It is a feature of the invention that turpentine recovery is unusually high because the wood chips are introduced into the digester under a head of steam so that turpentine production and recovery starts as soon as the flow of chips to the digester is started. To insure such recovery, the temperature of the liquor is maintained at approximately its boiling temperature.

The maximum benefits and efficiency of operation of my continuously pressurized batch digestion apparatus are obtained when operating with a plurality of digesters. There may be two such units operated in tandem, or a group of four or more digesters arranged as illustrated in FIG. 2.

When this is the case, the selective chip feeder illustrated in FIG. 3 is employed for feeding the chips selectively first to one digester and then to another. The pressurized, presteamed chips are transferred from a presteamer 28 into discharge spout 38 mounted rotatably on powered shaft 42 in pressurized case 32. With the spout in its FIG. 3 position, chips are directed into digester fill pipe 16 associated with the lower left hand digester of FIG. 2. Upon conclusion of the digester charging operation, the spout is rotated to the fill pipe 18 of a companion digester, e.g. the upper left hand digester of FIG. 2.

During the operation of the system, one digester is filled while the other is blown, using the same time cycles of operation. For example, if a cooking cycle of one hour is to be employed, the first digester may be filled over a time period of one hour and then, after stopping the feed, blown over a time period of one hour. During the blowing cycle, the second digester is charged over a time period of one hour.

As the first digester is blown, the hot black liquor discharged via pipe 72c to heat exchanger 64 is used to heat white liquor fed via pipe 64b to the second digester. The low pressure steam from flash tank 58 is fed via pipe 60 to feed hopper 22 where it presteams chips being fed to the second digester. If desired, a predetermined amount of the hot black liquor exhausted from the first digester via pipe 74c may be transferred to the second digester via pipes 74e and 74g. In the alternative, it may be returned to the digester from which it was exhausted via line 74f.

If a faster feed period is desired, for example a feed period of 30 minutes, while retaining the same digestion time of one hour, the first digester is fed over a period of 30 minutes and the feed stepped. The cook is continued for another 30 minutes after which the digester is blown for a period of 30 minutes. During the blowing cycle the companion digester is charged for a like period of 30 minutes.

Where four digesters are employed in conjunction with each other and a cooking period of one hour is retained, keeping in mind that a capacity equivalent to one digester is unused as each digester pair is filled and emptied, then each digester may be filled and blown respectively over a time period of 20 minutes. In the event one digester requires shut down for maintenance, the remaining three digesters may be operated using fill and blow cycles of 30 minutes each, respectively. A high degree of versatility and flexibility thus is characteristic of the system.

The hereindescribed process for pulping lignocellulose in continuously pressurized batch digesters is illustrated in detail in the following example.

EXAMPLE

In carrying out the process of the invention in a system similar to that illustrated in FIG. 1, as applied to the kraft pulping of wood chips, there is employed a combination of two digesters each of which has a volume of 3,330 cubic feet. The digesters are so arranged that one fills while the other discharges.

The cooking time per digester is 60 minutes and the cooking temperature is 344° F. The oven dry weight of the uncompacted wood chip feed is 12.5 lbs. per cubic foot. After the chips have been softened by cooking, the average compacted wood chip weight is 16.25 pounds per cubic foot. The total weight of wood required to fill each digester is 54,112 pounds, wet wood basis, or 8,225 pounds, oven dry basis.

The total weight of active alkali used in the pulping process is 15.2% of the oven dry weight of the wood. The concentration of the active alkali in the white liquor, expressed as $Na_2O$, is 6.2 pounds per cubic foot.

Other operating variables are as follows:

The temperature of the white liquor employed is 180° F. in storage and 320° F. after the heat exchanger. In the heat exchanger black liquor extracted at the rate of 315 gallons per minute from the discharging digester is used for preheating the white liquor.

The temperature of the wood chips is 60° F. in storage. They are presteamed, however, to a temperature of 344° F. in the presteaming units of the assembly before they enter the digester.

The digester to be filled is pressurized with steam at 110 pounds per square inch (344° F.) before starting the flows of liquor and chips.

In filling the empty digester, the liquor flows are started first. The chip flow then is started 3 minutes after the liquor flows are started.

The flow rate of the white liquor is 154 gallons per minute for a period of 60 minutes. The flow rate of the black liquor, which is obtained from the companion discharging digester, is subject to variation within limits depending upon the moisture content of the wood chips and the feed. It is controlled at such a rate as to keep uniform the rise of the liquor level in the charging digester over the entire charging period.

The chip flow to the empty digester is started 3 minutes after the liquor flows are started. The chips then are fed at a uniform rate for 60 minutes.

After a continuous charging time of one hour, the chips first introduced into the digester are fully cooked. The flow of feed chips and liquor are terminated and the digester blown over an additional period of one hour. During the one hour discharging period cold black liquor from storage is pumped into the bottom of the digester at the rate of 620 gallons per minute. This black liquor serves not only to displace the hot cooking black liquor but also to dilute the pulp leaving the digester to a 7% consistency.

To maintain a constant cooking time, the flow of pulp from the discharging digester is set at 771 gallons per minute so that the digester empties in 60 minutes. When the discharging digester is empty, the blow valve is closed and the flow of displacement liquor stopped. The digester remains pressurized ready for filling. At this time the discharging and filling cycles are reversed.

When operating in this manner, the capacity of the system is 357 air dry tons of pulp per day at 50% yield. The steam consumption is approximately 1600 pounds per ton of pulp, as compared with 4000 pounds per ton of pulp when operating batch digesters of the conventional type which are alternately pressurized and depressurized with the cooking and emptying cycles.

When cooking soft woods, turpentine in yields of the order of 1.5 to 4 gallons per ton of pulp, depending on wood species and condition, are relieved from the digester automatically and sent to recovery.

The advantages of my continuously pressurized batch digestion system for producing cellulosic pulps are many.

Steam consumption is low. In fact, steam consumption for my batch process is in the range of, or even lower than, that characteristic of continuous pulping processes.

Stated otherwise, heat recovery is high. The amount of steam used to produce a ton of pulp depends upon the temperature of the wood, the moisture content of the wood, the temperature and quantity of white liquor used, the temperature and quantity of the black liquor, the final cooking temperature, the pulp yield and radiation losses. Batch digesters generally use from 3600 to 4500 pounds of steam per ton of pulp. Continuous digesters are from 1800 to 2300 pounds of steam per ton of pulp, excluding high yield semi-chemical pulps. My system uses only from 1200 to 1800 pounds of steam per ton of pulp.

Where plural digesters are used in cooperation with each other, peak steam loading problems are overcome, since the steam demand will be continuous in view of the fact that one digester fills while another empties.

Pulp uniformity from batch to batch is greatly increased.

Because the digester is under steam pressure and at cooking temperature before the feeds of chips and chemical liquors are started and continued at controlled rates, both the chips and the digesting liquors are raised to cooking temperature in less than five minutes. In fact, the digesting liquors will be at cooking or at selected starting temperature before they settle in the digester since they are fed in at the top of the digester and pass immediately through a high temperature steam zone where their temperature is brought to operating temperature.

Also, the chips are presteamed both before introduction into the digester and in the steam zone after introduction into the digester with the result that their temperature is raised immediately to cooking level.

Furthermore, operation of the rotating arm and displacement liquor feeding assembly of FIG. 5 prevents channeling of the pulp and promotes its orderly discharge from a discharge during the blowing cycle, thus contributing measurably to pulp uniformity from batch to batch.

Still further, the concentration of the directing liquors is kept uniform since the condensate formed by heating the chips and digesting liquors is intimately mixed with the liquors at all times. Consequently the chips always are impregnated and surrounded by liquor layers of uniform concentration at uniform temperature throughout the entire cooking cycle.

Pulp uniformity from batch to batch is further promoted for the reason that the cooking times in my system are precisely controlled by feeding in the chips and digesting liquors at controlled rates. This rate is such as to fill the digester in the time selected. After stopping the feed of raw materials, the blow cycle is initiated and continued for a period substantially equal to the fill cycle. The chips introduced to the digester thus all have uniform retention times and as a result are digested with a high degree of uniformity.

Yet another primary advantage of my system of batch digestion is that it produces uniform pulp by compensating automatically for variations in the amount of water contained in the wood chips being fed to the digester and also in the amount of condensate produced in the digester. If not compensated for, these factors will alter the concentration of the digesting liquor with resultant adverse effect on pulp quality.

The total volume of liquor needed to fill the digester is that required to fill the voids between the chips, and saturate the chips. Wood chips cooked to make pulp have two saturation points. One is the saturation point at atmospheric conditions. The other is that under conditions existing inside the digester which causes wood to swell, permitting the absorption of more liquor.

The amount of liquor absorbed by the chips entering the digester depends upon the moisture content of the chips before they enter. Liquor absorbed up to the equivalent of the atmospheric saturation point must be compensated for by changing the amount of black liquor fed into the digester, if the liquor level is to be at the desired height when the digester is filled.

Liquor absorbed by the chips between atmospheric and digester saturation points will not change the amount of liquor needed to fill the digester and will have no effect on the desired liquor level. The absorption of this liquor is accompanied by the swelling of the wood, each change in volume off setting the other.

In addition to promoting pulp uniformity from batch to batch, my batch system has the advantage of a continuous digester insofar as chip compaction is concerned. As is apparent, the digester contains a mixture of chips ranging from raw chips to cooked pulp. Since the feed under pressure continues while cooking under pressure takes place, advantage can be taken of the compaction of the cooked pulp and more chips can be introduced into the digester than otherwise would be the case. In fact, whereas in conventional batch digestion processes a compaction ratio of 1.1:1 is characteristic, when the digester is filled at atmospheric pressure, a compaction ratio of up to 1.5:1 is characteristic of the digester of my system. This obviously largely increases the production capacity of the digester.

Yet another primary advantage of my continuously pressurized batch wood pulping process lies in the efficient utilization of the black liquor for heat and chemical recovery, as well as for cooking efficiency.

In batch digesters, it is essential that the chips be submerged in the cooking liquor. Otherwise the quality of the pulp will suffer. The quantity of white liquor employed at concentrations which are desirable, is never sufficient to submerge the chips. The addition of black liquor in amount sufficient to do so is required.

It is desirable to use black liquor for chip submergence in order to maintain high solids in the black liquor when it is sent to recovery, and also to make use of the residual chemical content of the black liquor.

However, the necessity of adding additional black liquor to a conventional batch digester is the main reason that the digester uses more steam per ton of pulp than does a continuous digester. Continuous digesters generally have no need for additional black liquor to maintain the chips in a submerged condition.

In my continuously pressurized batch system the use of black liquor is less than that required when using conventional batch digesters. Moreover, since my system is always under steam pressure and cooking temperature, the black liquor is extracted from a digester which is emptying at a controlled rate and transferred under pressure, without loss of heat, to a digester which is filling at a controlled rate. Thus, regardless of how much black liquor is required by the filling digester, the steam consumption is only that required to heat the chips and white liquor in the first instance, and to overcome radiation losses.

Turpentine recovery is exceptionally high in the continuous pressurized batch digester in my invention because the chips and liquor are raised to cooking temperature as soon as they enter the digester. Turpentine recovery starts while the head of liquor above the chips is low. This facilitates the movement of the turpentine from the liquid to the vapor phase. The steam pressure in the digester is maintained at or close to the boiling point of the liquor so that optimum pressure conditions exist for conversion of the turpentine from the liquid to the vapor phase.

In addition, when turpentine once vaporizes in the digester, it will remain vaporized in its movement up through the liquor because the temperature of the liquor above the point where vaporization occurs is the same as the point where it occurred. This prevents condensation. When the digester is filled and the capping valve closed, the recovery of turpentine continues as in batch digesters.

In my system, compensation for changes in chip moisture content and condensate volume is made automatically by regulating the flow of black liquor in the digester in such a manner that the liquor level in the digester increases at a uniform and controlled rate. Any changes in wood moisture content and condensate volume, as reflected by changes in rate of digester liquor level increase are compensated for at once by adjusting the flow rate of the black liquor entering the digester so that the rate at which the digester liquor level increases remains constant. As a consequence, the liquor at the top of the liquor pool is maintained at a constant concentration all the time the digester is filling and chips entering the digester are always submerged in liquor of constant concentration.

The net result of all of these factors is the production in on easily carried out accurately controlled batch process, of cellulosic pulp of uniform quality, resulting in high yields from batch to batch, with an exceptionally high degree of heat recovery and correspondingly low fuel cost.

Having thus described my invention in preferred embodiments, I claim:

1. The process for the batch production of cellulosic pulps by the chemical digestion of pieces of lignocellulose which comprises:
   (a) providing a pressurizeable batch reaction vessel defining a vertical path along which the lignocellulose progresses from top to bottom,
   (b) pressurizing the vessel with steam to substantially the predetermined digestion pressure and temperature,
   (c) while maintaining the vessel at substantially digestion pressure and temperature charging the vessel with flows of presteamed lignocellulose pieces and both hot fresh and hot spent digestion liquors for a predetermined charging period,
   (d) the fresh liquor flow containing digestion chemicals in the predetermined amount being charged to the vessel at a substantially constant rate commensurate with the rate of charging the lignocellulose pieces,
   (e) the spent liquor flow being charged to the vessel at a variable rate sufficient to maintain during the charging period a substantially constant rate of liquor rise within the vessel and to keep the lignocellulose pieces substantially submerged in the liquor, thereby compensating for variations in water extraneously introduced into the digester from steam condensation and lignocellulose water content,
   (f) digesting the lignocellulose in the vessel for the predetermined digestion period at the digestion pressure and temperature,
   (g) when the lignocellulose in the lower part of the digester has been digested for said digestion period, continuously withdrawing the resulting pulp from the bottom of the vessel over a withdrawing period substantially equal to the vessel-charging period, thereby insuring subjection of the top and bottom portions of the lignocellulose charge to equal durations of pulping treatment within the vessel, and
   (h) while withdrawing the pulp from the vessel, diffusing cold spent digestion liquor from a stock thereof into a plurality of vertically and radially spaced diffusion zones in the bottom of the vessel at a diffusion rate predetermined to pass the displacement liquor radially through the zones during a time interval substantially equal to the time required for vertical travel of the pulp through the vertical zones.

2. The process of claim 1 including the step of introducing steam into the upper portion of the vessel for establishing therein a steam zone and passing the fresh liquor through the steam zone for elevating its temperature to substantially the digestion temperature.

3. The process of claim 1 including the step of providing at least two pressurizeable reaction vessels, charging one of the vessels while discharging the other, and passing in measured flow the hot spent digestion liquor from the discharging vessel to the charging vessel as required to maintain a substantially constant rate of liquor rise in the charging vessel.

* * * * *